United States Patent
Flores et al.

(10) Patent No.: US 7,225,435 B2
(45) Date of Patent: May 29, 2007

(54) METHOD AND SYSTEM FOR ELIMINATING REDUNDANT EXECUTION SEQUENCES THAT APPEAR IN WORKLOADS DURING WORKLOAD SIMULATION ON AN E-BUSINESS APPLICATION SERVER

(75) Inventors: Romelia Flores, Keller, TX (US); Philip E. Reed, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 1374 days.

(21) Appl. No.: 09/911,650

(22) Filed: Jul. 23, 2001

(65) Prior Publication Data

US 2003/0028409 A1 Feb. 6, 2003

(51) Int. Cl.
*G06F 9/44* (2006.01)
(52) U.S. Cl. .................................. 717/135; 714/741
(58) Field of Classification Search ........ 717/168–178, 717/135; 714/738–741; 703/22
See application file for complete search history.

(56) References Cited

U.S. PATENT DOCUMENTS

| | | | | |
|---|---|---|---|---|
| 5,345,450 A | * | 9/1994 | Saw et al. | 714/741 |
| 5,862,309 A | * | 1/1999 | Duniho | 358/1.16 |
| 5,996,101 A | * | 11/1999 | Masumoto | 714/738 |
| 2002/0152061 A1 | * | 10/2002 | Shimogori et al. | 703/21 |

* cited by examiner

*Primary Examiner*—Wei Zhen
*Assistant Examiner*—Mulubrhan T. Tecklu
(74) *Attorney, Agent, or Firm*—Akerman Senterfitt

(57) ABSTRACT

The present invention provides a method and system for eliminating redundant execution sequences that appear in workloads during workload simulation on an e-business application server. The invention eliminates redundancy by creating command patterns for commands that recur. This use of the command patterns permit execution of commands without having to rewrite the software code necessary for implementing the command every time there is a necessity to use the command in a workload. By building a reference workload and cloning the command patterns for each workload, redundancy can be eliminated among the workloads.

11 Claims, 2 Drawing Sheets

METHOD AND SYSTEM FOR ELIMINATING REDUNDANT EXECUTION SEQUENCES THAT APPEAR IN WORKLOADS DURING WORKLOAD SIMULATION ON AN E-BUSINESS APPLICATION SERVER

BACKGROUND OF THE INVENTION

1. Technical Field

The present invention relates to the field of e-business, and more particularly, to a method and apparatus for testing an e-business application server to ensure that it can adequately handle overload conditions.

2. Description of the Related Art

The pervasiveness of the Internet has allowed companies to exploit electronic communications to engage in what is commonly known as e-business activities with their customers. E-business involves conducting business on the Internet and not only includes buying and selling goods and services, but can also include servicing customers and collaborating with trading or business partners. To accommodate this vast range of activities, companies strive to ensure that their systems operate optimally by implementing a traffic flow management policy.

A traffic flow management policy is a set of rules which dictate how workload should be handled by a system and corresponding subsystems. A workload is a task or group of tasks that require system resources in order for the system and its corresponding subsystems to process the task or group of tasks. A work request is an electronic request which can be used to request the processing of a workload. Hence, an effective traffic flow management policy should assign and distribute tasks associated with a workload to various processing elements within the system and its subsystems. Moreover, to ensure optimal performance, the traffic flow management policy must constantly monitor system conditions and dynamically adjust resources allocated to process the workload accordingly. Dynamic adjustment can also include redistributing and rescheduling processing of the tasks associated with a workload. Still, it is sometimes necessary to execute multiple application steps in order to simulate a single request. More particularly, this can happen whenever a work request requires the processing of multiple commands. Since the application steps are continuously repeated in multiple application steps, continually recoding the same commands necessary for executing the application steps is not the most efficient methodology for simulating a request. Furthermore, if there is a change to a command sequence that occurs in multiple application steps, then all occurrences of the command must be changed. This could require extensive code modifications which can be time consuming and costly.

Given these drawbacks, what is needed is an efficient method and system for eliminating redundancy among multiple execution sequences during workload simulation.

SUMMARY OF THE INVENTION

The invention provides a method and apparatus for eliminating redundancy among multiple execution sequences during workload simulation on an e-business application. The method can include the steps of creating a workload reference object having one or more reference command objects. In response to a work request to process a workload, selected ones of the reference command objects can be cloned or copied. The cloned or copied reference command objects can be assembled to create the workload required by the work request. The assembled command objects can subsequently be executed.

The step of creating the workload reference object can also include the step of parsing workload configuration data to create a master workload. Since the master workload contains all the workloads for the system and can be used to generate workloads, it can be appropriately called a workload generator. The workload configuration data that gets parsed can be stored in a file, for example, a workload configuration file.

In response to a request to add a new command, the workload configuration data stored in the workload configuration file can be modified. A workload reference object can be created using the workload configuration data. The created workload reference object can subsequently be assembled to create a workload executable, which is data that can be executed.

The invention also provides a method for eliminating redundancy among multiple execution sequences during workload simulation on an e-business application server. The method can include the steps of creating a command pattern for commands that recur in the execution sequences and building a reference workload using the created command pattern. In response to a work request to create a workload, selected commands in the reference workload can be cloned or copied to create the requested workload. The cloned or copied commands constituting the workload can subsequently be executed.

In a further embodiment of the invention a method for eliminating redundancy among multiple execution sequences during workload simulation on an e-business application server is disclosed. The method can include the steps of instantiating an invoker object, and utilizing the instantiated invoker to instantiate a command object. The command object can be assembled to create a workload executable. In response to a work request to process a workload, the workload executable can be executed.

The invention also provides a system for eliminating redundancy among multiple execution sequences during workload simulation on an e-business application server. The system can include an executable workload object, an invoker object and a master workload object. The invoker can instantiate and assemble command objects to create the executable workload object. Additionally, the invoker can manipulate the executable workload object. The master workload object can have rules which can be used to instantiate and assemble the command objects.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
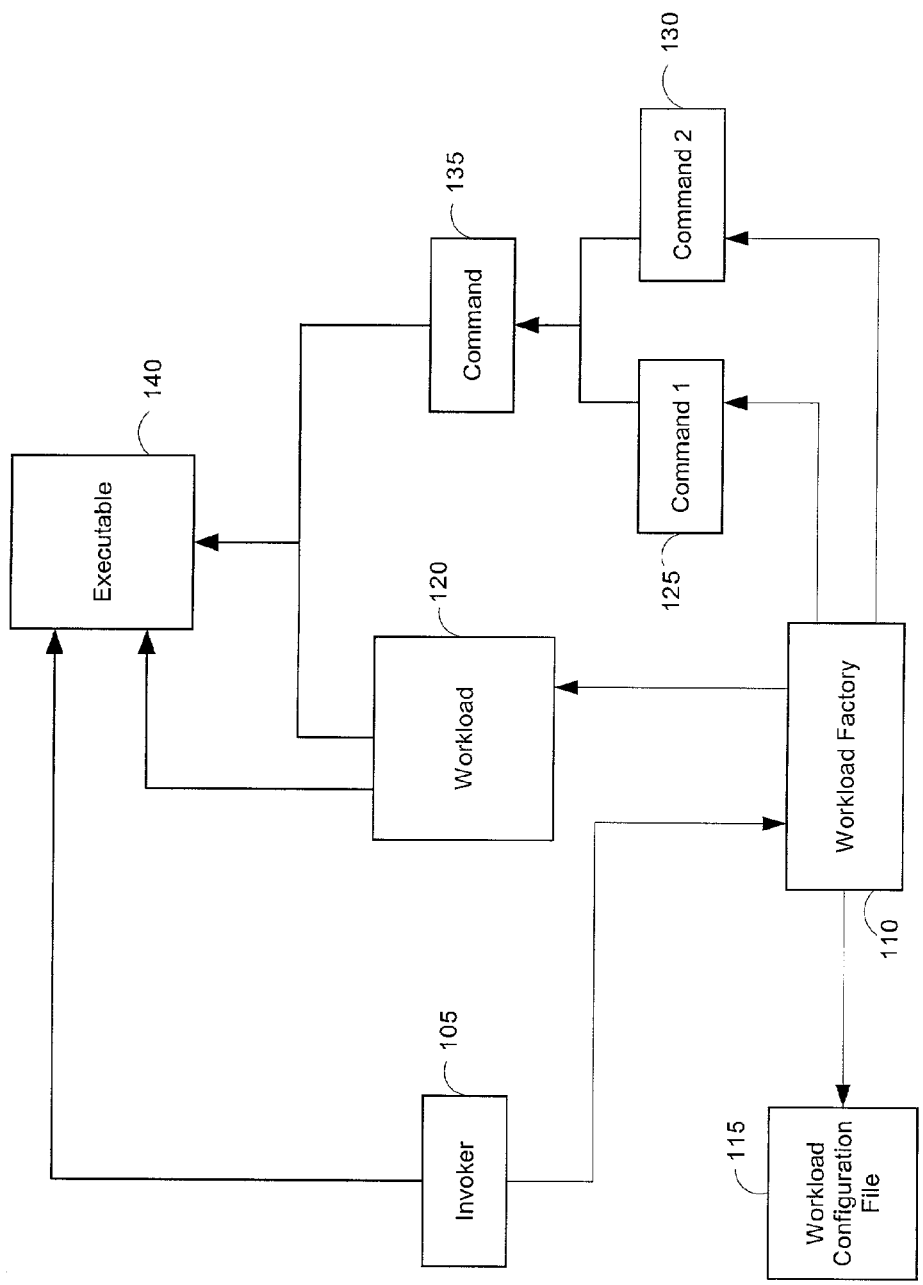
FIG. 1 is a high level block diagram of an exemplary system for eliminating redundancy among multiple execution sequences during workload simulation.

The present invention provides a method and system for eliminating redundant execution sequences that appear in workloads during workload simulation on an e-business application server. The invention eliminates redundancy by creating command patterns for commands that recur. This use of the command patterns permits execution of commands without a programmer having to rewrite software code necessary for implementing the command each time it is necessary to use the command in a workload. By building a reference workload and cloning the command patterns for each workload, redundancy can be eliminated among the workloads.

A workload pattern can be defined as an object (workload object) which can contain other workload objects and/or command objects. A pattern is the abstraction from a concrete form which recurs in specific non-arbitrary contexts. When applied to workloads, a workload pattern can be identified for workloads that repeatedly use the same commands. The workload pattern provides the ability to combine these repeatedly used commands into an entity identified as a workload, thereby eliminating any need to repeat commands. By doing this, the workload pattern creates an abstract sequence of command steps, which are void of repeated execution sequences, necessary for the efficient execution of a work request. This also reduces the scope of code modifications that are required when introducing new functionality or modifying existing workloads.

The workload pattern utilizes an executable object which can be manipulated by an invoker. The invoker is an object which can be instantiated by an application server. Integral to the workload pattern is an application called a workload generator. The workload generator can contain the rules governing the relationship that can exist between requests, workloads and commands. In response to an incoming workload request, the workload generator can instantiate command objects and can assemble instantiated objects into appropriate workload objects. By modifying the rules within the workload generator, new combinations of command objects can be created, which represent the execution sequence of a particular request.

The workload generator can include an external configuration file which contains workload assembly and execution rules. The configuration file permits the definition of new commands and workloads without code modifications. In order to add a new command or assemble new workloads, appropriate assembly and execution entries can be made to the configuration file. Additionally, if any classes are required, then these classes can be added to a classpath and the application restarted. Workloads can then be requested by a utilizing a workload identifier defined in the configuration file.

An exemplary workload configuration file having different workloads formatted in XML can be defined as follows:

```
<WORKLOAD name=ORDERTOTAL>
    <COMMAND class=SCalc>
        <File>"/temp/Small.gif"</File>
    </COMMAND>
</WORKLOAD>
<WORKLOAD name=ORDERTOTALANDTAX>
    <COMMAND class=SCalc>
        <File>"/temp/Small.gif"</File>
    </COMMAND>
    <COMMAND class=TaxCalc>
    </COMMAND>
</WORKLOAD>
<WORKLOAD name=LISTOFSTATES>
    <COMMAND class=DBAccess>
        <URL>"jdbc:db2://asil.spring.newnet:6789/STATES"</URL>
```

-continued

```
        <Driver>"COM.mbi.db2.jdbc.net.DB2Driver"</Driver>
        <Statement>"select state from DB2ADMIN.addr where
            ZIP_CODE1 = '58203'</Statement>
        <User>"db2admin"</User>
        <Passwd>"db2admin"</Passwd>
    </COMMAND>
</WORKLOAD>
<WORKLOAD name=COMBINEDWRKLD>
    <%WORKLOAD name=ORDERTOTAL>
    <%WORKLOAD name=LISTOFSTATES>
</WORKLOAD>
<WORKLOAD name=TOTALCOMBINEDWRKLD>
    <%WORKLOAD name=ORDERTOTAL>
    <%WORKLOAD name=ORDERTOTALANDTAX>
    <%WORKLOAD name=LISTOFSTATES>
    <COMMAND class=CrossSell>
    </COMMAND>
</WORKLOAD>
```

It should readily be understood that the formatting of the workload in an XML format is not intended to limit the invention. Other formats are possible such as, communication formats similar to XML and plain text. The workloads depict various exemplary transactions that can be utilized by an e-business system. The first workload (ORDERTOTAL) calculates an order total by utilizing an SCalc command class. The second workload (ORDERTOTALANDTAX) calculates an order total with a specified amount of tax, by utilizing the Scalc class and TaxCalc command class. The third workload (LISTOFSTATES) defined in the exemplary configuration file executes a database query that retrieves a list of states from a database given specified zip codes. These defined workloads can be executed individually or can be utilized as the building blocks for other workloads. For example COMBINEDWRKLD is made up of the ORDERTOTAL and the LISTOFSTATES workloads which were previously defined. The fourth workload and final workload is TOTALCOMBINEDWRKLD. This workload includes the ORDERTOTAL, the ORDERTOTALANDTAX, and the LISTOFSTATES workloads which were previously defined, along with a new command, CrossSell. The CrossSell command is shown after LISTOFSTATES. The CrossSell command executes additional cross-selling logic.

By defining the workloads as illustrated in the exemplary configuration file, software code associated with a class can be easily reused. For example, the software code for the SCalc class can be used separately, or reused in combination with other commands as shown throughout the various exemplary workloads. Whenever it becomes necessary to define a new workload that requires calculations similar to that done by the SCalc software code, then the new workload can be easily defined using the SCalc code without having to rewrite the software code necessary for implementing the SCalc calculation.

FIG. 1 is a high level block diagram of an exemplary system for eliminating redundancy among multiple execution sequences during workload simulation. Referring to FIG. 1, an invoker object 105 can be instantiated upon initiation of a servlet, for example, a workload driver. The invoker 105 can request a workload from the workload generator 110. The workload generator 110 can determine which workloads are to be initiated by parsing a workload configuration file 115. Upon determination of the workloads to be initiated, the workload generator 110 can provide to the invoker object, the pertinent rules necessary for building workloads 120. For example, the workload generator 110 can combine command 1 and command 2 to create command 135 which can be used to construct workload 120. The workload generator 110 will parse the configuration file building commands which can be used to construct workloads 120. The workloads can subsequently be executed as an executable 140.

Upon receipt of a request for a particular workload, for example, a hypertext transfer protocol (HTTP) request, the workload can be identified and a cloned or copied of the workload, including the workload commands can be created. Upon instantiation of the clone or copy, the workload can subsequently be executed.

The invoker 105 can be a part of a core workload driver and contains software logic which can facilitate the building of the workload generator 110 upon the initial instantiation of the invoker 105. This ensures that all the commands and rules necessary for the subsequent creation of workloads are available. The invoker 105 can subsequently issue requests for a specific workloads, clone or copy the commands for requested workloads and execute the workload. Cloning the commands can include creating a copy of the command.

Figure 2:
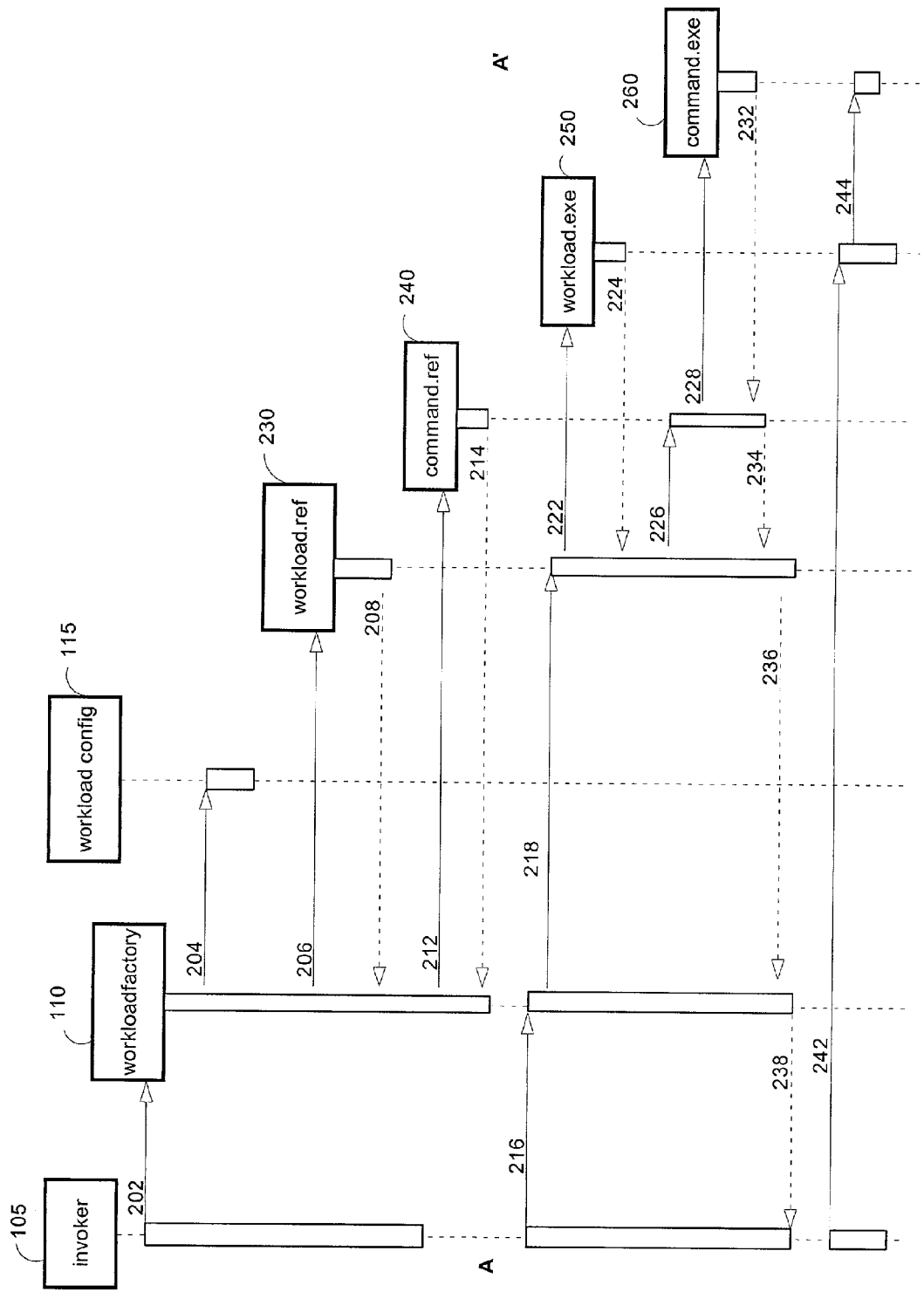
FIG. 2 depicts an exemplary event diagram illustrating the steps occurring upon initial and subsequent instantiation of an invoker for the system described in FIG. 1.

FIG. 2 depicts an exemplary event diagram illustrating the steps occurring upon initial and subsequent instantiation of an invoker for the system described in FIG. 1. The initial instantiation of the invoker is depicted above the line designated by AA', and the subsequent instantiation is depicted below the line designated by AA'. Subsequent to a work request to create a workload, invoker 105 can initiate a function, for example a constructor 202, to create the workload generator 110. The invoker 105 can create the workload generator 110 by parsing the workload configuration file 115 as shown in step 204. For multiple configuration files, the invoker can parse all the configuration files. Using information parsed from the configuration file 115, the invoker 105 can create a list which can include the workload identification and workload commands. This list can be utilized for creating a reference workload 230 as depicted in step 206. In step 208, the reference workload can be stored in the workload generator 110. Similarly, for each workload that gets created, corresponding reference commands 240 will also be created as depicted in step 212. The reference commands can also be stored in the workload generator 110 as depicted in step 214.

Subsequent to the initial instantation of the invoker 105, a HTTP request for a particular workload can be received. In steps 216, 218, 222 and 224, the invoker 105 can instantiate a workload executable object 250. This cloned or copied workload executable 250 is a replica of the reference workload 230. In steps 226, 228, 232, 234, 236 and 238, for each instance of the workload executable object 250, an executable command object 260 can be instantiated from the reference command 240 of the workload generator 110. The executable command object is a replica of the reference command 240. The workload is now ready to be executed as depicted in steps 242 and 244.

The present invention can be realized in hardware, software, or a combination of hardware and software. A method and apparatus for eliminating redundancy among multiple execution sequences during workload simulation according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for eliminating redundancy among multiple execution sequences during workload simulation of an e-business application, the method comprising:
   identifying at least one redundant command within a work request;
   selecting at least one reference command object from a workload reference object that corresponds to said redundant command, wherein said workload reference object comprises at least one reference command object that is an executable command for processing and responding to at least one task in said work request;
   copying said at least one reference command object into a configuration file; and
   assembling said at least one reference command object with other reference command objects copied into said configuration file create a workload,
   wherein said reference command objects are combinable for dynamically adjusting the reallocation, redistribution, and rescheduling of resources across multiple e-business systems.

2. The method according to claim 1, wherein said selecting select step further comprises parsing workload configuration data stored in said workload configuration file to create a master workload.

3. The method according to claim 2, further comprising providing an administrator the to modify said workload and execute said assembled command objects across multiple e-business systems.

4. The method according to claim 3, further comprising:
   modifying said workload configuration file to add a new command for producing a modified workload configuration file;
   creating said workload reference object Using said modified workload configuration file; and
   assembling said workload reference object to create said workload.

5. A method for eliminating redundancy among multiple execution sequences during workload simulation on an e-business application server, the method comprising:
   identifying a sequence of redundant commands within a work request;
   creating a command pattern for said sequence of redundant commands;
   "building a workload from said work request by replacing redundant command sequence in said work request with said command pattern; and"
   "executing said workload for responding to said work request." to
   "building a workload from said work request by replacing redundant command sequences in said work request with said command pattern by"

"assembling at least one reference command object with other reference command object copied into a configuration file to create said workload; and"

"executing said copied commands workload for responding to said work request,"

"wherein said reference command objects are combinable for dynamically adjusting the reallocation, redistribution, and rescheduling of resources across multiple e-business systems."

6. A machine readable storage having stored thereon, a computer program having a plurality of code sections, said code sections executable by a machine for causing the machine to perform the steps of:

prior to receiving a work request, creating a workload reference object comprising a plurality of reference command objects for eliminating redundancy among multiple execution sequences during workload simulation on an e-business application, wherein a reference command object responds to at least one task of a work request;

upon receiving a work request, identifying at least one redundant command within said work request;

selecting at least one reference command object from said workload reference object that corresponds to said redundant command, copying said at least one reference command object into a configuration file; and assembling said at least one reference command object that was copied into said configuration file to create a workload, wherein said reference command objects are combinable for dynamically adjusting the reallocation, redistribution, and rescheduling of resources across multiple e-business system to efficiently process redundant commands of said work request.

7. The machine readable storage according to claim 6, wherein said selecting step further comprises parsing workload configuration data stored in said workload configuration file to create master workload for providing an administrator the ability to modify said workload.

8. The machine readable storage according to claim 7, further comprising executing said assembled command objects of said workload across multiple e-business systems.

9. The machine readable storage according to claim 8, further comprising:

modifying said workload configuration file to add a new command for producing a modified workload configuration file;

creating said workload reference object using said modified workload configuration file; and assembling said workload reference object to create said workload.

10. A machine readable storage having stored thereon, a computer program having a plurality of code sections, said code sections executable by a machine for causing the machine to perform the steps of:

creating a command pattern for redundant command sequences, said creating step for eliminating redundancy of multiple execution sequences during workload simulation on an e-business application server;

identifying a sequence of redundant commands within a work request;

creating a command pattern for said sequence of redundant commands;

"building a workload from said work request by replacing redundant command sequence in said work request with said command pattern; and"

"executing said workload for responding to said work request," to

"building a workload from said work request by replacing redundant command sequences in said work request with said command pattern by"

"assembling at least one reference command object with other reference command object copied into a configuration file to create said workload; and"

"executing said copied commands workload for responding to said work request,"

"wherein said reference command objects are combinable for dynamically adjusting the reallocation, redistribution, and rescheduling of resources across multiple e-business systems.

11. A machine readable storage having stored thereon, a computer program having a plurality of code sections, said code sections executable by a machine for causing the machine to perform the steps of:

instantiating an invoker object, said invoker object instantiating a plurality of command objects, said commands objects for executing specific commands;

said instantiating step for eliminating redundancy among multiple execution sequences during workload simulation on an e-business application server; assembling said command objects to create a workload executable; and executing said workload executable.

* * * * *